T. S. MILLER.
CABLEWAY.
APPLICATION FILED JAN. 16, 1906.

907,845.

Patented Dec. 29, 1908.
6 SHEETS—SHEET 1.

Witnesses
Richard W. Seabury.
W. A. Pinling

Inventor
Thomas Spencer Miller
By his Attorneys

T. S. MILLER.
CABLEWAY.
APPLICATION FILED JAN. 16, 1906.

907,845.

Patented Dec. 29, 1908.
6 SHEETS—SHEET 2.

Witnesses
Richard W. Seabury
W. A. Pauling

Inventor
Thomas Spencer Miller
By his Attorneys
Giffard & Bull

T. S. MILLER.
CABLEWAY.
APPLICATION FILED JAN. 16, 1906.

907,845.

Patented Dec. 29, 1908.
6 SHEETS—SHEET 3.

Witnesses
Richard W. Seabury.
W. C. Pauling.

Inventor
Thomas Spencer Miller
By his Attorneys
Gifford & Bull

UNITED STATES PATENT OFFICE.

THOMAS SPENCER MILLER, OF SOUTH ORANGE, NEW JERSEY.

CABLEWAY.

No. 907,845.  Specification of Letters Patent.  Patented Dec. 29, 1908.

Application filed January 16, 1906. Serial No. 296,247.

*To all whom it may concern:*

Be it known that I, THOMAS SPENCER MILLER, a citizen of the United States, and a resident of South Orange, county of Essex, and State of New Jersey, have invented a new and useful Improvement in Cableways, of which the following is a specification.

My invention relates to certain improvements in cableways that are particularly applicable to the conveyance of cargo, such as coal, from one vessel at sea to another, although some features are applicable to other purposes also.

In United States Letters Patent granted to me heretofore, I have described various cableway constructions adapted for transporting cargo between vessels at sea involving a supporting-rope, a carriage traveling thereon and various forms of yielding and recovering mechanisms adapted for automatically paying out and taking up such lengths of the cableway as are requisite to maintain the cableway approximately at a normal curvature notwithstanding relative variations of distance between the vessels. For example, in Patent No. 736996, I have shown a yielding and recovering mechanism consisting of a rope-drum frictionally operated in antagonism to the pull of the cableway so that the slipping friction affords the yielding and recovering power; in Patent No. 637143, this yielding and recovering power is afforded by a yielding fluid pressure and in Patent No. 637142, by a sea anchor.

One feature of my present invention consists in so combining the cableway with the vessels that said yielding and recovering operation shall be relieved of supporting the full weight of the load by enlisting the water in said support by permitting the load to normally rest in the water during its passage from one vessel to the other. In this way, the relief from the weight of the load not only eases the yielding and recovering mechanism, but also enables a smaller supporting rope to be used in the cableway. Not only may the water thus assist in maintaining a normal curvature of the cableway, but it may also perform the function which I have heretofore accomplished by a traction rope; or, in other words, produce the relative traveling motion between the cableway and the load carriage.

Other features of invention available either in combination with the foregoing, or otherwise, will be apparent from the following description and claims.

In the accompanying drawings, Figures 1 and 2 are a side view and a plan of a towing and towed vessel containing my present invention in the form in which the two side cableways are independent of each other. Fig. 1ª shows the sea anchor and the rope connections thereof.

1 is the supply ship which is the towing vessel and is shown as a collier.

2 is the consuming or receiving ship which is the towed vessel and is shown as a warship.

3 (in Figs. 1 to 4, inclusive) are the tow lines between the two ships.

4 and 5 are the cableways or ropeways, each consisting of a supporting-rope upon which a series of load-carriages 6 and 7, respectively, travel.

8 and 9 are overhung cableway holders projecting outboard at the sides of the supply vessel 1.

10 and 11 are cable way holders projecting outboard from the sides of the receiving ship 2. These holders may consist of booms, derricks, cranes or brackets. The cableway 4 is stretched between the extremities of the holders 8 and 10 while the cableway 5 is stretched between the extremities of the holders 9 and 11.

Figures 10, 11, 12, 13, 14, 15, 16, 17:
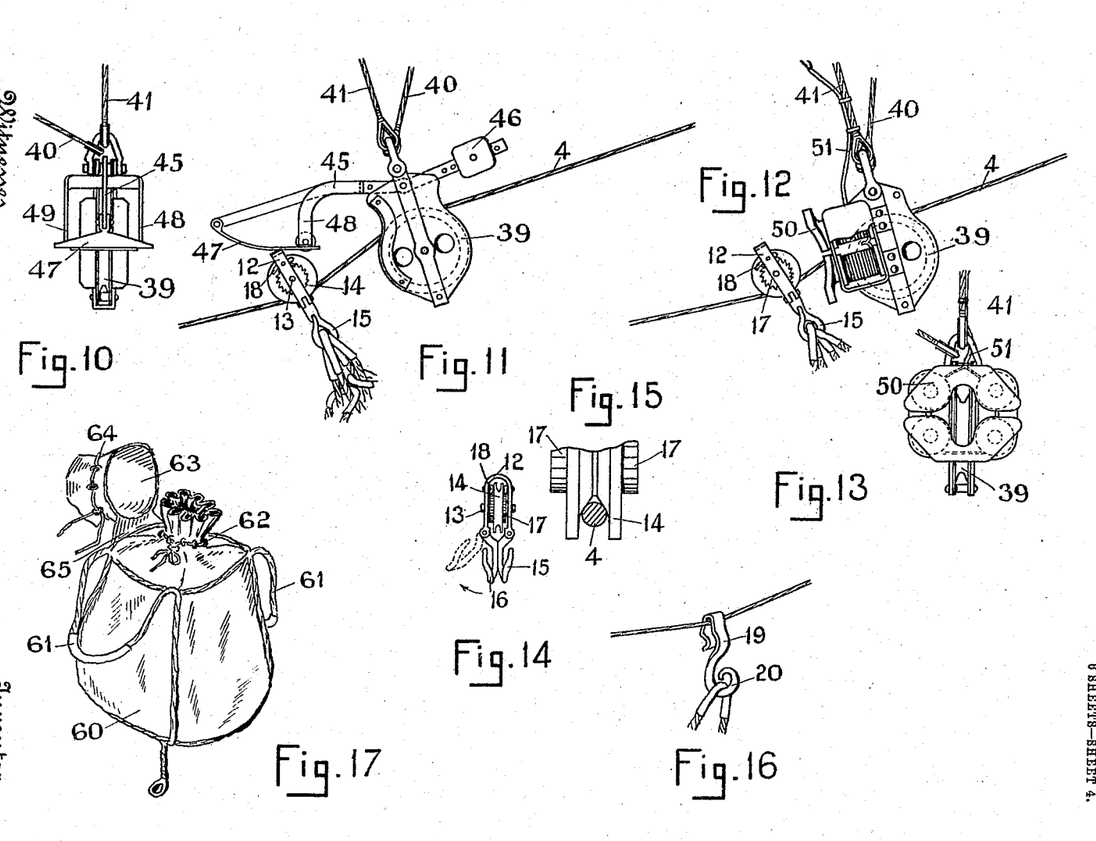
Figs. 10 and 11 are details of one form of load carriage and of the apparatus coöperating therewith at the receiving end.
Figs. 12 and 13 are details of another form of the same.
Figs. 14 and 15 are details of the load carriage shown in Figs. 11 and 12.
Fig. 16 is a detail of another form of load carriage.
Fig. 17 is a detail of the bag or load receptacle.

The load-carriage in the form shown in Figs. 11 12, 14 and 15, consists of a yoke 12 carrying the axle 13 of the wheel 14 grooved to fit the supporting rope 4. To the extremities of the yoke are pivoted the hooks 15 and 16 arranged back to back, as shown. Each of these hooks is preferably of the ram's horn type shown. When one or both loops of the bag are engaged with both hooks of a carriage, the engagement is so secure as to resist all danger of disengagement of the bags from the hooks and also to prevent the possibility of disengagement of the carriage from the supporting-rope during transit. At the same time, when the bag is lifted from the hooks, the outward pivoting of the hooks provides an opening so that the carriage may be lifted entirely free of the supporting rope. To provide against backward movement of the carriage upon the rope in case its forward propelling force should be lost for any cause, I place upon one or both sides of the wheel 14, a ratchet 17 fast to the wheel and a pawl 18 pivoted to the yoke. The groove in the sheave may also be of such form as to pinch the supporting cable, as shown in Fig. 15, so as to constitute a resistance against slipping.

A simpler form of carriage is shown in Fig. 16, which will answer in some cases. This consists of one hook 19 loosely engaging the supporting rope so as to admit of slipping thereon and another hook 20 engaging the bag.

Figures 1, 1A, 2:
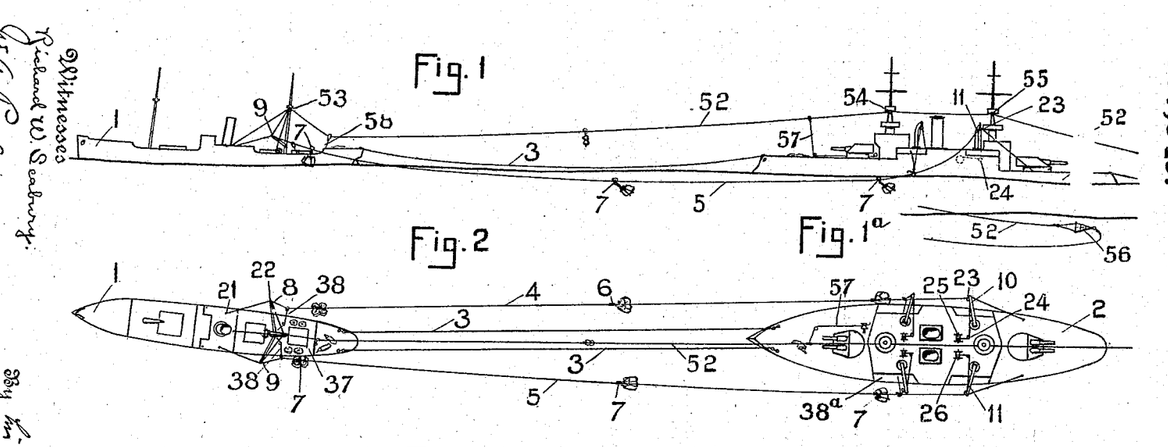
Figure 7:
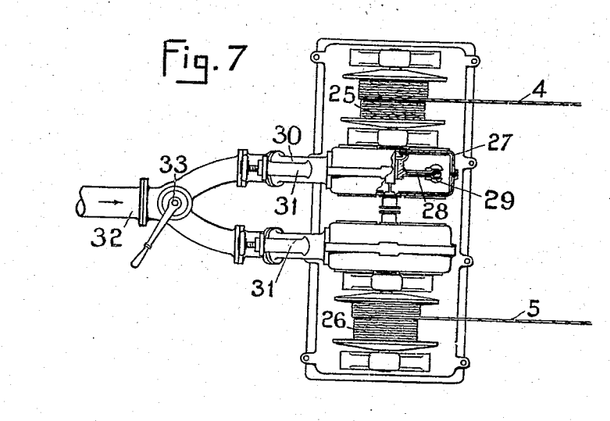
Figs. 7 and 8 are details of one form of yielding and recovering mechanism.
Figure 8:
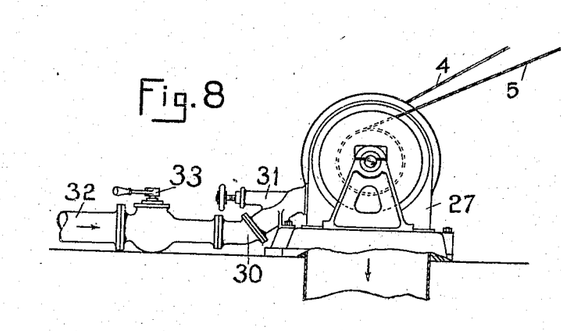
Figure 9:
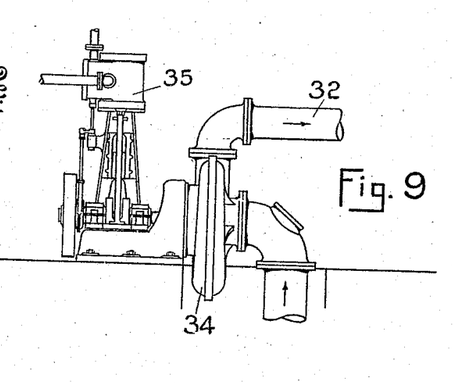
Fig. 9 is a detail of the pump engine by which said yielding and recovering mechanism may be driven.

In the form shown in Figs. 1 and 2, the supporting ropes 4 and 5 are independent of each other and a description of one rope and its appurtenances will answer for both. One end of the rope 4 is made fast to the vessel 1 at 21, thence it extends around a sheave 22 on the end of the support 8; thence to and around a sheave 23 on the end of support 10; thence inward and around a sheave 24 to a rope-drum 25 on the deck of the vessel 2 to which rope-drum it is made fast. 26 is the corresponding rope-drum for the cableway 5. The rope-drums 25 and 26 which respectively constitute a form of yielding and recovering mechanism for controlling the tension on the supporting ropes 4 and 5 are under the influence of a motor of some construction constantly striving to rotate them in a direction to haul in upon the supporting ropes 4 and 5. They thus exert a constant tension upon said ropes and maintain them at an approximately normal curvature or normal elevation in or above the water; being, however, capable of yielding to the strain of said ropes so as to pay them out when the strain upon the ropes exceeds the power propelling the drums. In this way, the supporting ropes 4 and 5 are kept under a uniform tension in spite of the varying lengths which are necessary in them to accommodate the relative motion between the vessels for any cause, whether it be the pitching of the vessels, the yawing of the vessels or variations in the length of the tow-line due to shrinking, stretching or slipping. The form of motor exerting such tension shown in Figs. 7 and 8, is what is known as the impact water wheel motor consisting of a circular casing 27 containing a wheel 28 on the periphery of which are mounted a series of cups or buckets 29 receiving the impact from a stream of water flowing through the pipe 30 controlled by a needle-valve 31. The water supplying the motors for both of the rope-drums 25 and 26, may be received from the same pipe 32 from which it is directed to either or both of the two motors, as may be required by the valve 33. The water for the pipe 32 may be supplied from a centrifugal pump 34 operated by the engine 35. Since warships are invariably provided with pumps for fire or baling purposes, the water for the running of said motors may be supplied from any one of the ship's pumps already existing on board and, therefore, further description of the details of either the pump or the engine shown in Fig. 9 is unnecessary. At the same time, the use of the water from the ship's pump for driving a motor of the impact water-wheel type will be found admirably adapted to maintain the yielding tension which is requisite for the control of the supporting rope by the drums 25 and 26 and the needle throttle valves 31 provide the means whereby the operator can regulate the power of the yielding and recovering mechanism with great exactness to maintain the normal curvature of the cableway in operation.

In the construction shown in Figs. 3 and 4, only one rope-drum, 26, is employed for exerting tension upon the two supporting ropes 4 and 5, since said ropes are joined together across the vessel 1 and extend as follows: One end is fastened to the drum 26 from which the rope extends around the sheaves 24, 23 and 22, but instead of being made fast to the vessel 1, as in Figs. 1 and 2, it continues across the vessel 1 and around the sheaves at the opposite side 22, 23, and is made fast at 36 to the receiving ship. In this case, the two supoprting ropes 4 and 5 constitute, in substance, two runs of the same rope and will act as compensators for each other for certain motions between the vessels; such motions as are not compensated for in this manner being responded to by the yielding and recovering drum 26.

Figure 4:
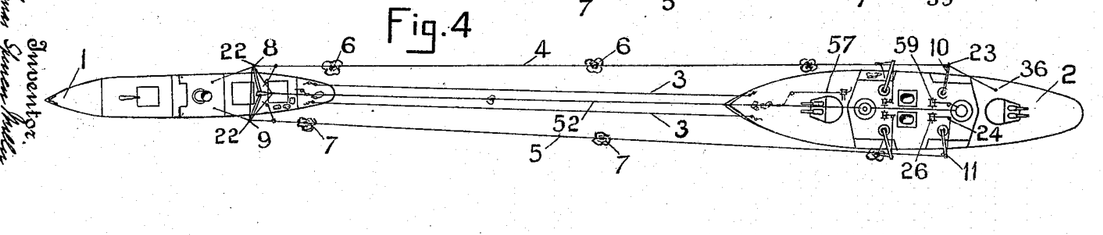
Figure 5:
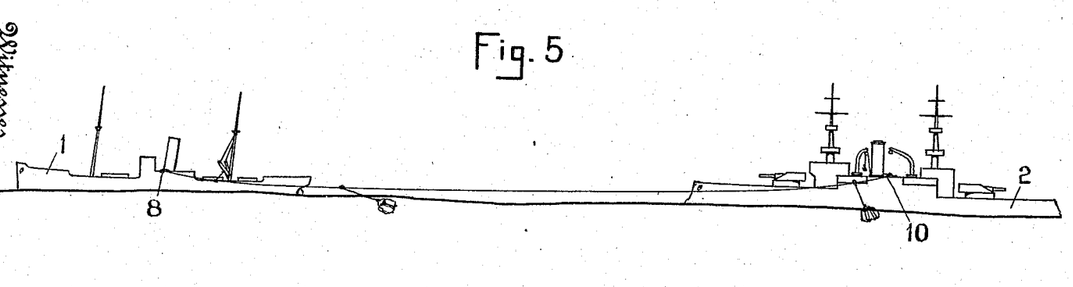
Figs. 5 and 6 are corresponding views of a form in which the side cableways act as tow lines connecting the corresponding sides of the two vessels at points approximating the center of longitudinal motion.
Figure 6:
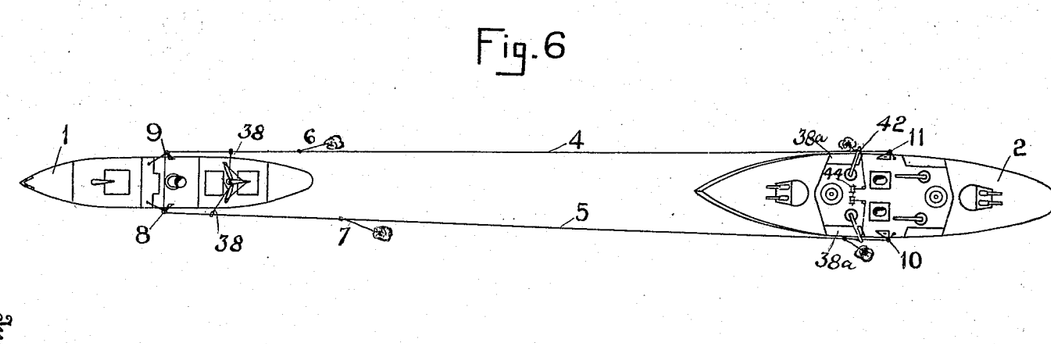

In the construction shown in Figs. 5 and 6, the cableway supports 8, 9, 10, 11 are each placed at approximately the longitudinal center of yawing and pitching motion of its vessel. In this way, the effect of such motions upon the ropes is minimized. In Figs. 5 and 6, moreover, the supporting ropes 4 and 5 are connected together across the vessel 1 so as to constitute two runs of a single rope and act as compensators, or as yielding and recovering mechanisms for each other. In Figs. 5 and 6, the two ropes, 4 and 5, are shown as constituting not merely the cableways, but also the tow-ropes; thus performing, also, the function of the ropes 3, 3, of Figs. 1 to 4, which, in Figs. 5 and 6, are dispensed with. In this case, the ropes 4 and 5 must be made of sufficient size to stand the towing strain.

Figure 3:
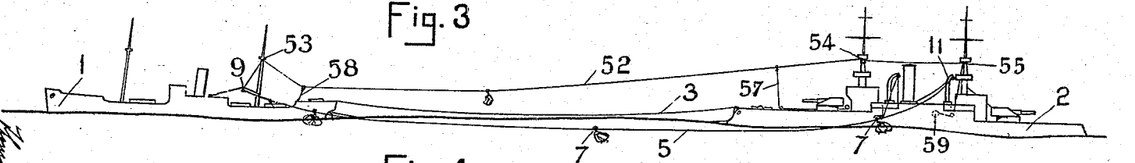
Figs. 3 and 4 are corresponding views of a form in which the two side cableways are connected across the towing vessel.

Both in the constructions shown in Figs. 5 and 6, and that shown in Figs. 3 and 4, the tension operation afforded by the drum 26 may be dispensed with, in some cases, though with less perfect results. When this is dispensed with, the yielding and recovering mode of operation will have to be supplied exclusively by the coöperation of one cableway with the other through their mutual connection.

Figure 18:
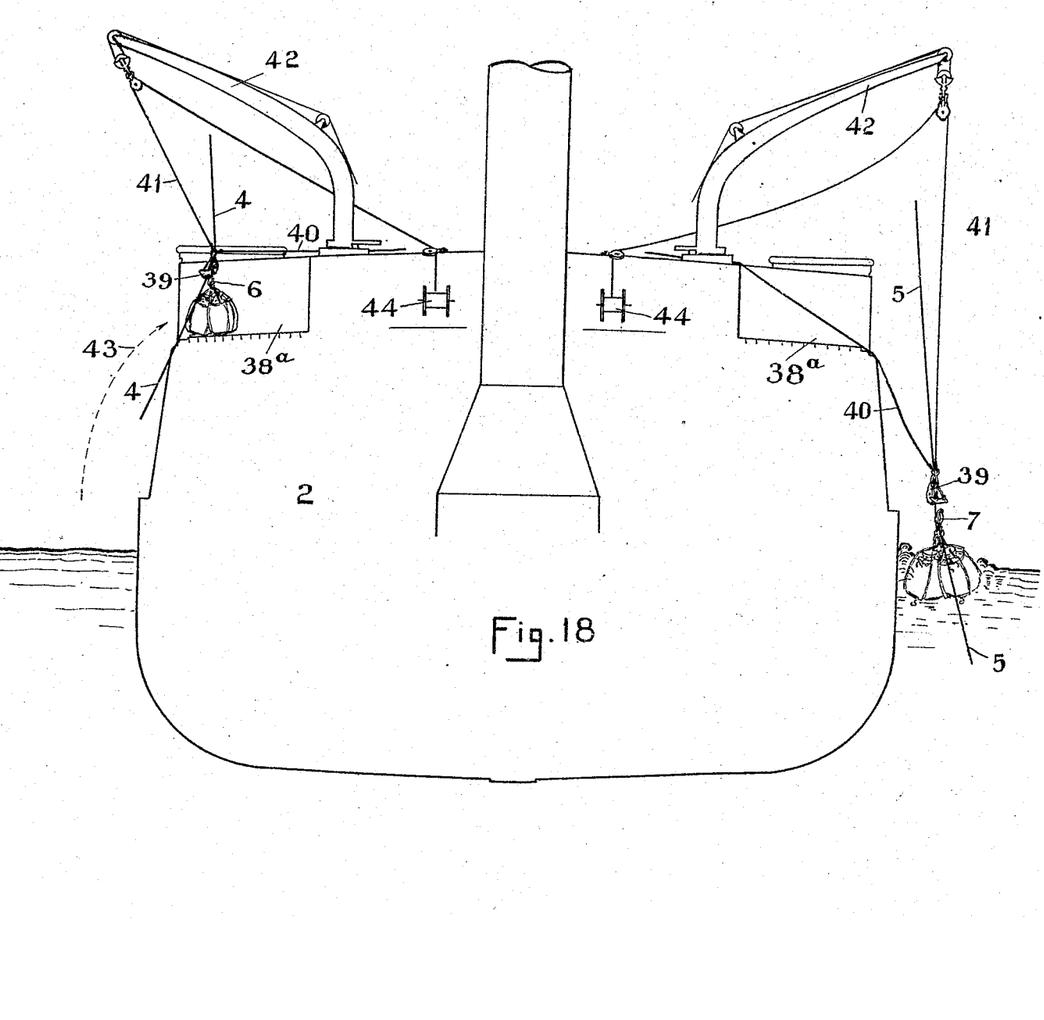
Figs. 18 and 19 are an end and side view illustrating in detail the operation of receiving the bags.
Figure 19:
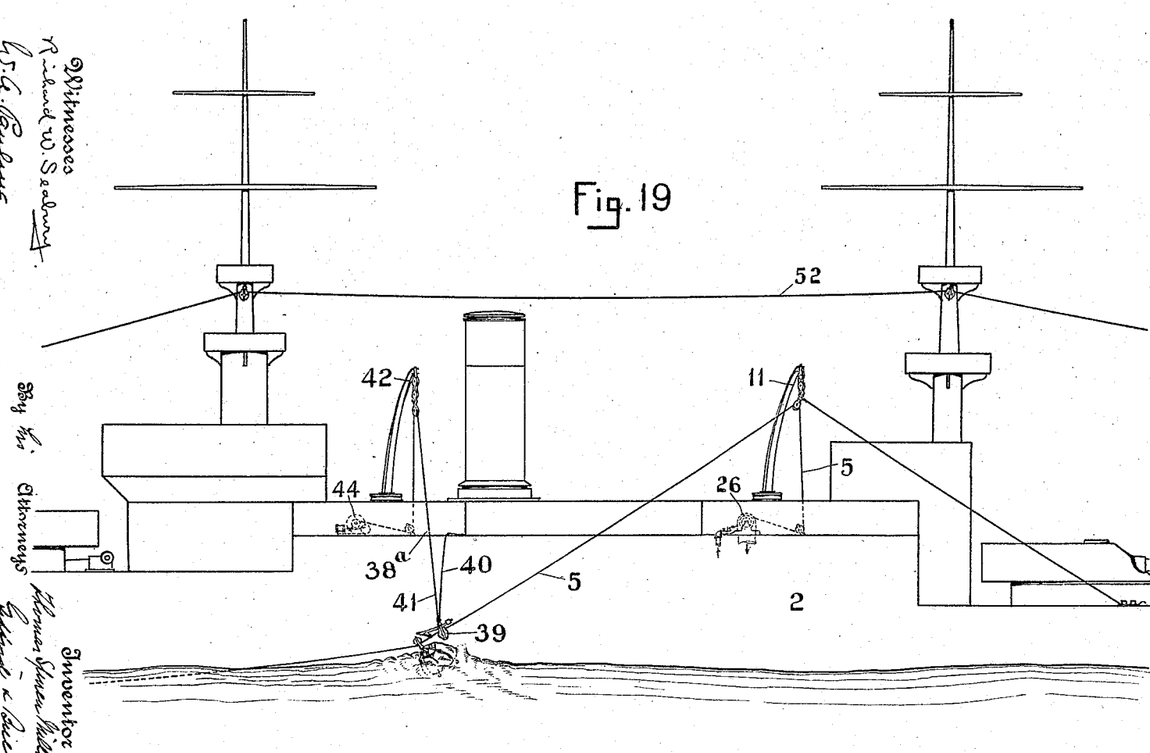

In my United States Letters Patent No. 786510 dated April 4, 1905, I have described a means for unloading a cableway which, in principle, I apply in the present apparatus, both to loading and unloading. It consists of means for engaging the cableway intermediate its supports so as to deflect it toward a load rest. In the present apparatus, the load rest 37 at the loading end of the cableway consists of the deck of the vessel 1 or a platform erected thereupon and the means by which the cableway is deflected toward said load rest consists of an inhaul rope 38 controlled by a drum or winch-head, such as found on board ship. When the operator desires to load a carriage on the cableway, the rope 38 is caused to deflect the cableway sufficiently inwardly and downwardly so as to bring it within reach of the operator at the load-rest 37 who places a carrier upon the supporting rope and hooks a bag or bags thereto. Then the tension on the inhaul rope 38 is released whereupon the tension on the supporting-rope takes up its deflection and removes the bags from the load-rest overboard. The action of gravity will now cause the load-carriage and its bags to run downward into the water. Thereupon, the water will oppose the forward movement of the load with the progress of the vessels so as to cause the supporting-rope to run forward through the load-carriage until the carriage reaches a point at one side of the receiving ship, as shown in Figs. 18 and 19. At this point, is located a means for deflecting the cableway toward the receiving load-rest 38$^a$ consisting of a sheave-block 39 engaging the supporting-rope 4 or 5, as the case may be, and controlled by the inhaul ropes 40 and 41, one of which serves to deflect the cableway upward toward the crane or derrick 42, and the other of which serves to deflect it inwardly so that the load is made to describe the course indicated by the dotted arrow 43, in Fig. 18. The rope 41 may be actuated by a suitable drum 44 and corresponding means of actuation may be provided for the rope 40.

In order that the load-carriage may be retained in position at the sheave-block 39 during its described course to the load-rest 38$^a$, the following detainer mechanism is provided: On the sheave-block 39 is pivoted a lever 45, the rear end of which may contain a counterweight as 46 and the front end of which is constructed in the form of a broad hook consisting of the broad inclined face 47 extending between the forked ends 48 and 49. This hook when ready to receive the arriving load-carriage is in such position that the top of the yoke 12 of the load-carriage will strike against the inclined face 47 of the hook and raise the hook until it is passed by the load-carriage, whereupon the hook will drop down in front of the load-carriage and hold the same in place between the hook and the block 39 until by the action of the deflecting ropes 40 and 41 already described, the load has been deposited upon the receiving rest 38$^a$.

Instead of having a purely mechanical device for detaining the load-carriage at the block 39 while it is being picked up out of the water and deposited on the receiving load-rest, I may accomplish the same result electrically by placing upon the face of the block 39, a magnet or magnets 50, the poles of which are presented to the load-carriage upon its arrival and magnetically hold the same during its transfer from the water to the receiving load-rest. The electricity for supplying the magnets may be conducted through any suitable wires, as 51, and as soon as the load reaches the load-rest, the breaking of the current will cause the release of the load-carriage. Thereupon, the operator unhooks the bag or bags from the carriage and removes the carriage itself from the cableway and by paying out on the ropes 40 and 41 permits the deflection of the cableway to be taken up in readiness for the arrival of another loaded carriage.

The return of the carriages and empty bags from the receiving to the supply-ship may be accomplished in the following manner: 52 (Figs. 1 to 4, and 19) is a supporting-rope or cableway adapted to receive the same carriages 6 and 7 before referred to. This supporting-rope is stretched between a sheave 53 on the mast of the supply-ship and the sheaves 54 and 55 on the masts of the receiving ship. The end of the rope 52 on the supply-ship 1 is fast to the drum or barrel of a winch about which it is coiled several times. Its rear end is secured to a sea anchor 56 shown in Fig. 1$^a$ or other yielding and recovering device, such as the rope-drum 59 Figs. 3 and 4, adapted to maintain it at a normal curvature or elevation. Intermediate the supports 53 and 54 and over the deck of the receiving ship, is the deflecting rope 57 by which the rope 52 is deflected downwardly toward the deck of the receiving ship 2 into position for the operator to place thereon the carriages. Correspondingly, at the ship 1, is placed a deflecting rope 58 adapted to deflect the supporting rope 52 toward the deck of the vessel 1 for the detachment of the carriages. Several of the carriages and several bags in the form of a package may be secured to one carriage and sent back together. The sheave 54 on the ship 2 will have sufficient elevation so that the return of the carriages may be by gravity for a long portion of its journey. The conclusion of the journey, however, will be performed by hauling in on the end of the supporting-rope 52 at the ship 1 according to the mode of operation described in my application No. 214909 filed July 1, 1904. During the conclusion of the journey, if at an up grade, the backward movement of the carriage on the supporting-rope will be prevented by the pawl 18 and ratchet 17 already referred to and by the pinching engagement between the curve of the load-carriage wheel 14 and the supporting-cable 52.

Although I have described the cableway 52 as being operated for the return of the carriages and empty bags, it may, however, be used in the reverse direction for transporting the loaded-carriages from the supply ship 1 to the receiving ship 2, thus affording, together with the cableways 4 and 5, altogether three cableways acting simultaneously for the conveyance of the load from one ship to the other. When used in this manner, the operator will haul down upon the rope 58 and place a carriage upon the supporting-rope 52 and hook a loaded bag or bags thereon. He will then pay out on the supporting-rope 58 until the deflection thereof is taken up at the forward end. The operator at the receiving end will thereupon haul down upon the deflecting rope 57 until the rope inclines sufficiently from front to rear to cause the loaded carriage to run by gravity nearly to the receiving point. The completion of its journey will be caused by hauling in on the rear end of the supporting-rope 52.

The bags, which I am making the subject of a separate application, No. 294,716 filed Jan. 5, 06 are constructed as shown in Fig. 17, consist of a canvas body 60 provided with the rope supporting loops 61 and with a gathering string 62 by which the top may be gathered in the manner shown. A canvas cap 63 is also provided to fit snugly over the gathered top and this cap has, in turn, a gathering string 64 which holds it in place in conjunction with the flap 65 by which the cap is hinged to the side of the bag. The material of the bag is water-proofed, which fact, in connection with the gathering of the top and the cap upon the same, will exclude the water sufficiently from the interior of the bag so that very little water, if any, will enter the bag during the short time that the bag is immersed in its passage from one vessel to the other, which may not in practice exceed more than a minute or so; the coal being kept substantially dry.

The operation of the apparatus is as follows: The coal on the vessel 1 is filled into the bags in the hold which are hoisted onto the deck or platform, which constitutes the starting load-rest 37. The attendants then cause the rope 38 to deflect the supporting rope close to this load-rest and place thereon a carriage and hook one or more bags thereto. They then release the rope 38 and the carriage runs downward to the water by gravity. The coal now rests in the water which supports it to such extent that the supporting rope is relieved of a large portion of its strain and not only requires less tension to maintain its position but, also, may be made of much smaller size than if it were called upon to support the load unaided by the water. While the bag is immersed in the water the advance of the vessels causes the supporting rope to run through the carriage until the block 39 comes up to the carriage whereupon the carriage will be automatically detained at said block, either electrically or mechanically, as above described. Thereupon, the attendant at the receiving ship will deflect the supporting rope by means of the ropes 40 and 41 until the load is deposited on the receiving load-rest 38ª, as shown in Fig. 18. Thereupon, the attendants will detach the bags from the carriage and the carriage from the supporting-rope and release the deflection of the supporting rope so as to allow it to assume its normal position ready for the next operation. Thereupon, the bags are dumped and they and the carriage are attached to the supporting rope 52 and returned to the supply vessel, as already described. There will thus be two runs of loaded bags passing between the vessels and one return run of empty bags.

In the drawings, I have shown the bags of coal in transit as being entirely submerged below the water line R. This, I consider to be an advantage because it places the bags below the most violent portion of the wave motion during the greater portion of their passage and, also, so far below the level of the tow-line as to prevent the possibility of the bags being thrown by the wave motion over the tow-line in their passage by a cross sea. The extent to which the bags are immersed, if any, below the surface, will, however, be dependent upon the nature of the contents of the bags and the manner in which they are tied.

Having thus described my invention, I claim as new and desire to secure by Letters Patent:

1. In combination, a pulling support, a pulled support, a plurality of cableways extending between the supports, means for deflecting the cableways, yielding and recovering mechanism for maintaining a uniform tension upon said cableways, a load receptacle, and means whereby the yielding and recovering mechanism is relieved from supporting the full weight of the load, such load being immersed in the water when on a deflected cableway.

2. In combination, a pulling support, a pulled support, two cableways, a flexible load receptacle for each cableway and a connection between said cableways whereby one acts as a yielding and recovering mechanism for the other, and means for relieving the yielding and recovering mechanism from supporting the full weight of the load.

3. In combination, a pulling support, a pulled support, two cableways, a load receptacle for each, a yielding and recovering mechanism and connections between said cableways whereby each coöperates with the yielding and recovering operation of the other, and means for relieving the cableways from the full weight of the load when such load is immersed in water during its passage.

4. In combination a towing boat, a towed boat, two towing lines respectively connecting the corresponding sides of the said boats, a load receptacle mounted upon one of said tow lines, and a third cable extending between the boats at a position between the two side lines.

5. In combination, a towing boat, a towed boat, two tow lines respectively connecting corresponding sides of said boats, means for maintaining uniform tension upon the tow lines, a load receptacle mounted to travel upon each tow line, and means for deflecting the tow lines.

6. In combination, a towing boat, a towed boat, two tow lines respectively connecting the corresponding sides of said boats, a load carriage mounted to travel upon each tow line and a connection between said towlines whereby one acts as a yielding and recovering mechanism for the other.

7. In combination, a towing boat, a towed boat, two tow lines respectively connecting the corresponding sides of said boats, a load carriage mounted to travel upon each tow line and a yielding and recovering mechanism and means for relieving the yielding and recovering mechanism from the full weight of the load at certain times during the passage of the load.

8. In combination, a pulling supply boat, a pulled consuming boat, a cableway, yielding and recovering mechanism for maintaining a substantially uniform tension upon the cableway, a load receptacle, and means for deflecting the cableway.

9. In combination, a pulling support, a pulled support, a cableway, laterally overhung holders for said cableway and means engaging said cableway intermediate said holders whereby it is deflected toward one of said supports.

10. In combination, a pulling support, a pulled support, a cableway, laterally overhung holders for said cableway and means engaging said cableway intermediate said holders whereby it is deflected toward both of said supports.

11. In combination, a pulling support, a pulled support, a cableway, an overhung holder for the cableway at one of said supports and means engaging with said cableway in front of said holder whereby the cableway is deflected toward one of said supports.

12. In combination, a pulling support, a pulled support, a cableway, overhung holders for said cableway, a load receptacle, a cableway-deflecting-mechanism and connections between said parts whereby the load is put overboard from the pulling support and picked up at the pulled support.

13. In combination a pulling support, a pulled support, a cableway, a load receptacle, yielding and recovering mechanism for maintaining substantially uniform tension upon the cableway, deflecting mechanism, overhung supports for said cableway, means for putting the load overboard at the pulling support, and means for recovering the load at the pulled support.

14. In combination, a propelled boat, a following boat, a connecting rope, a load carriage moving relatively along said rope, a load receptacle of flexible material constructed to practically exclude water, a cable deflecting mechanism and connections whereby the load is put overboard from the propelled boat and picked up at the following boat.

15. In combination, a pulling boat, a pulled boat, two cableways on opposite sides of said boat, a third cableway intermediate the two, means for transporting cargo on said side cableways and means for returning the receptacles for said cargo on said intermediate cableway.

16. In combination, a pulled boat, a pulling boat and three connecting cableways connecting said boats and adapted for conveyance of load receptacle; two of said cableways being arranged one on each side of the boats and the third intermediate the two.

17. In combination, a pulled boat, a pulling boat, three cableways connecting said boats and adapted for conveyance of load receptacles; two of said cableways being arranged approximately at the level of the hulls and the third being elevated on the masts.

18. In combination, a pulled boat, a pulling boat, three cableways connecting said boats and adapted for conveyance of load receptacles; two of said cableways being supported by outriggers and the third by the masts.

19. In combination, a towing boat, a towed boat and two cableways one on each side of said boats and extending from approximately the longitudinal center of motion of one boat to the other, and a third cable extending between the masts of the boats.

20. In combination, a pulling boat, a pulled boat, a cableway, a load receptacle and a yielding and recovering mechanism consisting of a rope drum operated by a liquid motor driven from the ship's pump.

21. In combination, a pulling support, a pulled support, a cableway, a load receptacle, connections between said parts whereby the load rests in the water during transit, a detainer whereby the load is secured at the delivery end of the cableway and means whereby it is hoisted from the water onto the pulled support.

22. In combination a cableway, supports for said cableway, a load carriage, means engaging said cableway whereby it is deflected toward its support, and a detainer whereby the carriage is held adjacent to the deflector during said deflection.

23. In combination, a cableway, its supports, a load-support intermediate said supports and elevated above the normal level of the cableway, a load-carriage and means whereby the load-carriage and cableway are lifted toward said support.

In testimony whereof, I have hereunto signed my name in the presence of two subscribing witnesses.

THOMAS SPENCER MILLER.

Witnesses:
  J. H. DICKINSON,
  R. B. CAVANOGH.